March 4, 1924.  
H. HIBBS  
POULTRY TANK HEATER  
Filed June 11, 1921
1,485,395
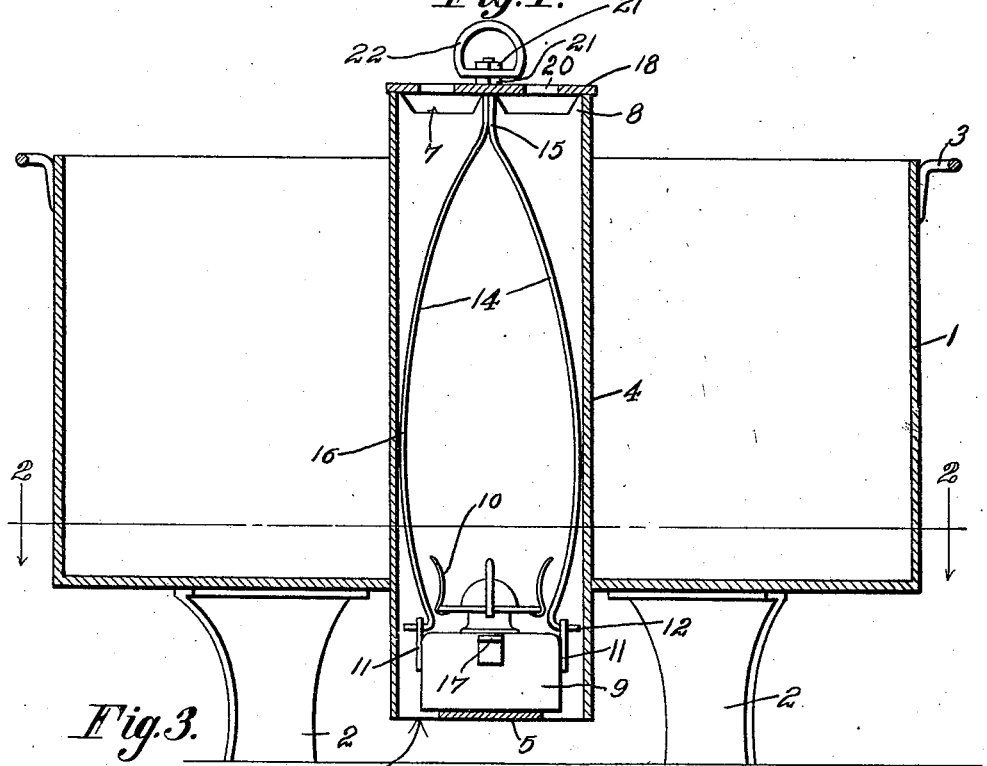
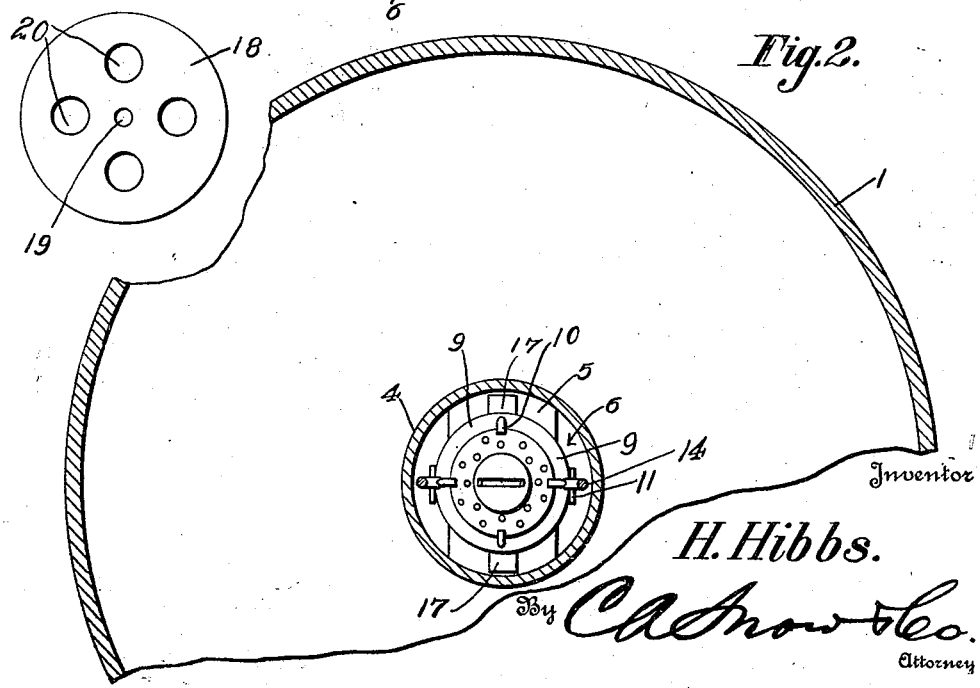
Inventor  
H. Hibbs.  
By C. A. Snow & Co.  
Attorney Patented Mar. 4, 1924.

1,485,395

UNITED STATES PATENT OFFICE.

HOLLIE HIBBS, OF LEETON, MISSOURI.

POULTRY-TANK HEATER.

Application filed June 11, 1921. Serial No. 476,838.

*To all whom it may concern:*

Be it known that I, HOLLIE HIBBS, a citizen of the United States, residing at Leeton, in the county of Johnson and State of Missouri, have invented a new and useful Poultry-Tank Heater, of which the following is a specification.

This invention aims to provide a simple means for heating the water or other material in a stock tank.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the drawings:—

Figure 1 shows in transverse section, a device constructed in accordance with the invention, parts remaining in elevation; Figure 2 is a section on the line 2—2 of Figure 1, parts being broken away; Figure 3 is a plan of the closure.

The numeral 1 marks a tank which may be supported on legs 2, the tank having handles 3. A tubular flue 4 is secured in the bottom of the tank 1. A support 5 extends across the lower end of the flue 4, the support being narrow enough so that air inlets 6 exist on each side of the support. At its upper end, the flue 4 may be cut away to fashion openings 7 and to form lugs 8 between the openings.

The numeral 9 designates a heater of any desired kind, located in the flue 4 and mounted on the support 5. The heater 9 may be in the form of a lamp, and if the heater takes the form of a lamp, the heater may or may not have means 10 for carrying a chimney, this detail being left to the taste of the user. The heater 9 is provided with upstanding ears 11 wherein are pivoted, outstanding fingers 12 formed on the lower ends of the side arms 14 of a bail which extends upwardly within the flue 4, the side arms of the bail merging into a stem 15. The side arms 14 of the bail are convexed outwardly and lie relatively close to the inner surface of the flue 4, as shown at 16. The heater or lamp 9 may be supplied with outstanding projections 17, spaced from the ears 11. Because the side arms of the bail are disposed close to the flue 4, as shown at 16, and because the heater 9 is provided with the projections 17, the heater or lamp 9 will be held in an approximately central position in the flue 4 on the support 5, the air finding its way upwardly through the inlets 6, evenly, about the heater.

The numeral 18 denotes a closure having a limited amount of sliding movement on the stem 15 of the bail, the closure having a central opening 19 for the reception of the stem of the bail. The closure 18 is equipped with other openings 20, and there may be as many or as few of these openings as is desired. The purpose of the openings 20 is to provide ventilation at the upper end of the flue 4, in conjunction with the openings 7 formed in the flue. Either the openings 7 or the openings 20 may be omitted, if desired, at the taste of the user. Nuts 21 are threaded on the stem 15, above the closure 18, and retain upon the stem 15 a handle 22 forming part of the bail.

When the parts are arranged as shown in Figure 1 of the drawings, the flue 4 and, consequently, the contents of the tank 1, will be heated from the member 9. Air enters by way of the inlets 6, and leaves either by the openings 7 or by the openings 20.

The heater 9 may be lifted out of the flue 4 by means of the bail and the handle 22 thereof. After the heater has been removed, the bail may be swung downwardly into an out-of-the-way position, because the fingers 12 of the bail are pivoted in the ears 11. The fingers 12 have an additional function, in that, should the side arms 14 of the bail not be curved outwardly enough to cooperate with the flue 4 at 16, the fingers 12 will coact with the projections 17 and aid in holding the heater 9 centered in the flue 4.

When the heater 9 is placed in the flue 4, the heater is carried by the support 5, and, since the stem 15 of the bail has a limited amount of sliding movement in the closure 18, the closure always will rest on the upper end of the flue 4, as shown in Figure 1. The obvious purpose of the closure 18 is to prevent rain, snow or foreign material of any kind from entering the flue 4 to an undesirable extent.

I claim:—

In a device of the class described, a tank, a flue mounted in the tank and having an opening, the flue being extended below the bottom of the tank to permit air to enter the opening, a heater in the flue and supported on the bottom of the flue, a bail comprising side arms assembled with the heater, the side arms merging into a stem having a handle, and a closure resting on the upper end of the flue, the stem passing through the closure, the closure being slidable on the stem to insure a seating of the closure when the heater rests on the bottom of the flue, the closure being located between the side arms and the handle, whereby the side arms and the handle will constitute stops which limit the movement of the closure on the stem when the heater has been lifted out of the flue.

In testimony that I claim the foregoing as my own, I have hereto affixed my signature in the presence of two witnesses.

HOLLIE HIBBS.

Witnesses:
S. I. MAJOR,
NICK M. BRADLEY.